United States Patent
Bakli et al.

(10) Patent No.: US 8,266,540 B2
(45) Date of Patent: Sep. 11, 2012

(54) CONFIGURATION BASED ENGINEERING DATA COLLECTION (EDC) FOR MANUFACTURING LINES

(75) Inventors: M'hamed Farid Bakli, Meylan (FR); Parris C. M. Hawkins, Los Altos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 1154 days.

(21) Appl. No.: 12/103,647

(22) Filed: Apr. 15, 2008

(65) Prior Publication Data

US 2009/0259961 A1    Oct. 15, 2009

(51) Int. Cl.
    *G06F 3/048* (2006.01)
(52) U.S. Cl. ......... 715/771; 715/772; 715/731; 715/735
(58) Field of Classification Search .................. 715/772, 715/731, 771, 735; 700/96, 181, 97
    See application file for complete search history.

(56) References Cited

U.S. PATENT DOCUMENTS

| | | | | |
|---|---|---|---|---|
| 5,339,257 | A * | 8/1994 | Layden et al. ................. 702/84 |
| 6,810,294 | B2 * | 10/2004 | Rangachari et al. ............ 700/97 |
| 7,079,990 | B2 * | 7/2006 | Haller et al. ..................... 703/2 |
| 7,142,938 | B2 * | 11/2006 | Chi et al. ...................... 700/106 |
| 2006/0004786 | A1 | 1/2006 | Chen et al. | |
| 2006/0064188 | A1 | 3/2006 | Ushiku et al. | |
| 2008/0059527 | A1 | 3/2008 | Thieme et al. | |
| 2008/0103617 | A1 * | 5/2008 | Subramanian et al. ......... 700/96 |
| 2009/0118855 | A1 * | 5/2009 | Joho ............................. 700/108 |

\* cited by examiner

*Primary Examiner* — Robert Stevens
*Assistant Examiner* — Sherrod Keaton
(74) *Attorney, Agent, or Firm* — Blakely, Sokoloff, Taylor & Zafman

(57) ABSTRACT

Methods and systems for integrating manufacturing equipment with factory automation software. In one embodiment, an equipment integrator (EI) has a user interface to facilitate user input of configuration information to provide an adaptable interface between a manufacturing tool and a manufacturing execution system (MES) that is operable over a plurality of manufacturing tools. The user configurable interface of the EI is adaptable so that tool-independent MES data collection requests may be satisfied by tool-specific data publication through the EI. In a further embodiment, data collected by the EI from a particular manufacturing tool is mapped to the MES without tool-specific interface coding. During processing, the configurable EI may fill a request from the MES for manufacturing data by collecting a data from the manufacturing tool, identifying data based on the configuration information and returning data satisfying a data keying criterion defined in the MES.

19 Claims, 10 Drawing Sheets

| Event Type | TD Type | TicTool | Collection Plan | EventId | VidNamesFilter | VidValues Filter |
|---|---|---|---|---|---|---|
| Start | Metro1 | | | E40_PROCESS_JOB_STATE_CHANGE | PrJobID, TO | @ProcessJobId, PROCESSING |
| Collect | Metro1 | | CPlan Wafer | WAFER_COMPLETE | Wafer_ID | @WaferId |
| Collect | Metro1 | | CPlanLot | LOT_COMPLETE | PrJobID | @ProcessJobId |
| End | Metro1 | | | E40_PROCESS_JOB_STATE_CHANGE | PrJobID, FROM | @ProcessJobId, PROCESS COMPLETE |
| Abort | Metro1 | | | E40_PROCESS_JOB_STATE_CHANGE | PrJobID, FROM | @ProcessJobId, ABORTING |
| Abort | Metro1 | | | E40_PROCESS_JOB_STATE_CHANGE | PrJobID, FROM, TO | @ProcessJobId, STOPPING, INITIAL |

FIG. 5D

CONFIGURATION BASED ENGINEERING DATA COLLECTION (EDC) FOR MANUFACTURING LINES

TECHNICAL FIELD

Embodiments of the invention to methods and systems for integrating manufacturing equipment with factory automation software.

BACKGROUND

Automated collection of process data from manufacturing equipment on a manufacturing line is a standard practice in complex process flows, such as those found in the semiconductor industry. For example, semiconductor manufacturing equipment may have hundreds of pickups from which data may be sensed at 100 Hz, or more. Generally, it is desirable to integrate such process data, or "engineering data" from each manufacturing tool into a factory-wide manufacturing execution system (MES) access to the data. Because the equipment is typically operated continuously on successive workpieces, perhaps processing each workpiece for only a few seconds, it is nontrivial to map volumes of data output by a piece of manufacturing equipment into a form required by the MES application.

While a number of MES applications (e.g. Promis®, Applied Fab300, Applied WorkStream, Wonderware, etc.) provide support for storing engineering data, because the specific behavior of each kind of manufacturing tool varies, the task to integrate process data generated by a manufacturing tool with such a MES requires custom coding of a software interface. For example, one interface type would be coded and implemented to collect etch-specific data, such as an endpoint time, output by a plasma etcher. Another interface type would be coded and implemented to collect inspection-specific data, such as defect adder count, output be a defect inspection station. Further customization of each of these interface types may also be required between an etcher of a first vendor (e.g. Applied Materials, Inc.) and a second vendor (e.g. Lam Research®) because of a lack of standardization across vendors.

Thus, at considerable expense, a team including a computer integration engineer familiar with the MES, an equipment engineer familiar with a specific types of equipment, and a process engineer familiar with the process parameters of a manufacturing operation would develop the specific software for each manufacturing tool interface within a particular manufacturing site

BRIEF DESCRIPTION OF THE DRAWINGS

The present invention is illustrated by way of example, and not by way of limitation, in the figures of the accompanying drawings and in which:

FIG. 5D illustrates a table for configuring a filter for data elements from a manufacturing tool based on a MES database key, according to an embodiment;

DETAILED DESCRIPTION

Figure 1:
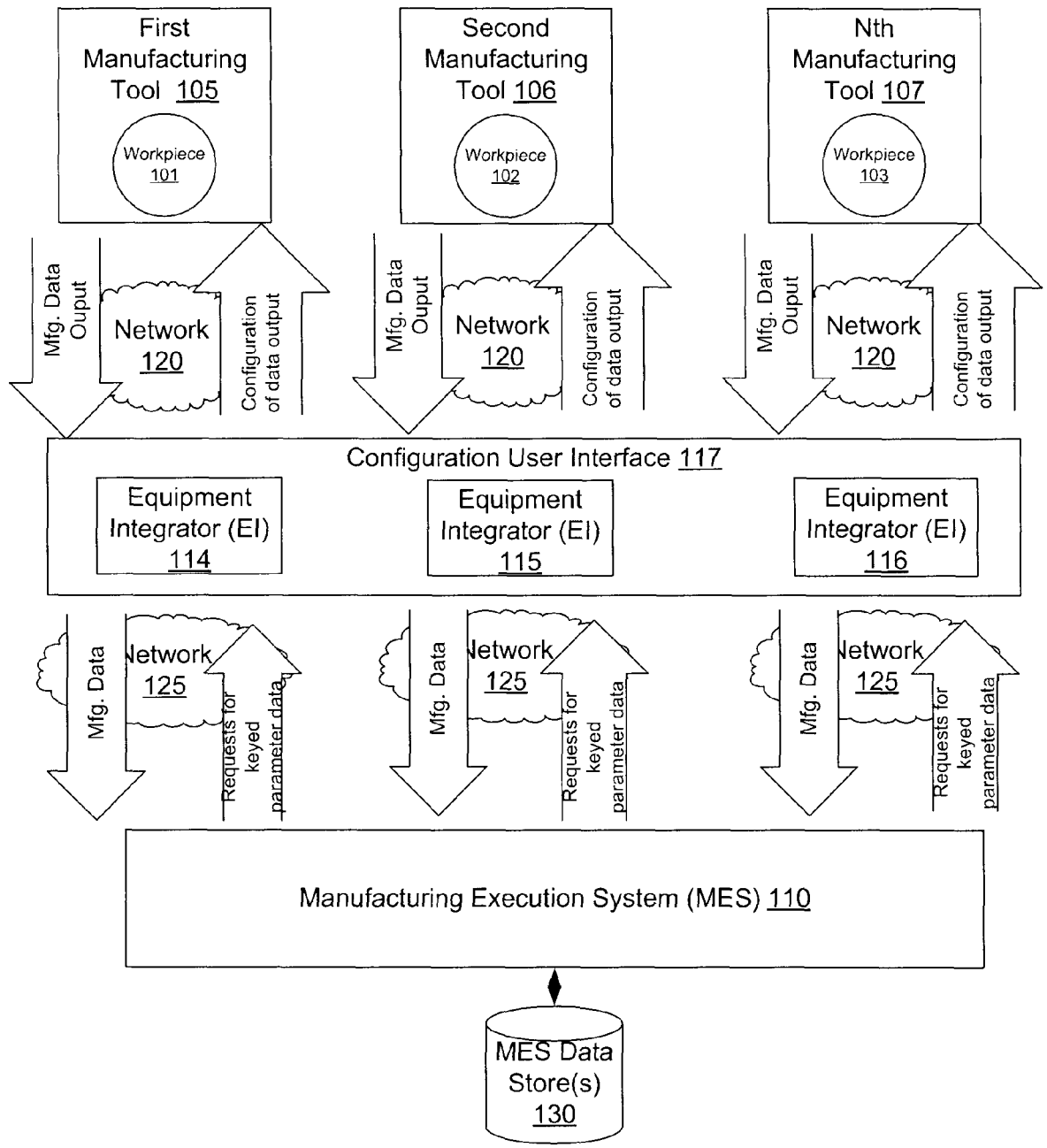
FIG. 1 illustrates an exemplary architecture of a manufacturing environment, in which embodiments of the present invention may operate.

Described herein are methods and systems for integrating manufacturing equipment with factory automation software. In one embodiment, an equipment integrator (EI) has a user interface to facilitate user input of configuration information to provide an adaptable interface between a manufacturing tool and a factory MES that is operable over a plurality of manufacturing tools. The user configurable interface of the EI is adaptable so that tool-independent MES data collection requests may be satisfied by tool-specific data publication through the EI. In a further embodiment, data collected by the EI from a particular manufacturing tool is mapped to the MES without tool-specific interface coding. During processing, the configurable EI may fill a request from the MES for manufacturing data by collecting a data from the manufacturing tool, identifying data based on the configuration information and returning data satisfying a data keying criterion defined in the MES.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. Unless specifically stated otherwise, as apparent from the following discussion, it is appreciated that throughout the description, discussions utilizing terms such as "displaying", "receiving", "consolidating", "generating", "updating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary architecture 100 of a manufacturing environment, in which embodiments of the present invention may operate. The manufacturing environment may be a semiconductor manufacturing environment, an automotive manufacturing environment, etc. The architecture 100 includes at least one manufacturing tool 105 and, as depicted, may further include a second manufacturing tool 106, and an nth manufacturing tool 107 for a plurality of n manufacturing tools. At a given point in a manufacturing process, the manufacturing tool 105 is capable of performing an action on workpiece 101. The action performed may be value-added or non-value added (metrology). The second manufacturing tool 106 is similarly capable of performing an action on a workpiece 102 that is either substantially the same as that of manufacturing tool 105 for parallel processing, or is subsequent to that performed by manufacturing tool 105 for serial processing. In a similar fashion, the nth manufacturing tool 107 may operate either in parallel or series on workpiece 103. Each manufacturing tool 105-107 is communicatively coupled to an EI 114-116 via a network 120 and each EI 114-116 is further communicatively coupled to manufacturing execution system (MES) 110 via network 125. Alternatively, one or more of EI 114-116 may be directly connected to relevant manufacturing tools 105-107 or the MES 110.

Each of the networks 120 and 125 may be a public network (e.g., Internet), a private network (e.g., Ethernet or a local area Network (LAN)), or a combination thereof. Either of networks 120 and 125 may include multiple private networks, which may be directly connected or connected via a public network. For example, the MES 110 may be connected to a first private network controlled by a foundry customer, while the manufacturing tool 105 may be connected to a second private network controlled by a virtual manufacturing site. Each of these private networks may be connected via a public network.

The MES 110 is a system that can be used to measure and control production activities in a manufacturing environment. The MES 110 may control some production activities (e.g., critical production activities) or all production activities of a set of manufacturing tools (e.g., all photolithography or metrology equipment in a semiconductor fabrication facility), of a manufacturing facility (e.g., an automobile production plant), of an entire company, etc. The MES 110 may include manual and computerized off-line and/or on-line transaction processing systems. Such systems may include client computing devices, server computing devices, databases, etc. that may perform functions such as processing of workpieces 101-103, equipment and material tracking, dispatching (e.g., determining what material goes to what processes), workpiece genealogy, labor tracking (e.g., personnel scheduling), inventory management, costing, electronic signature capture, defect and resolution monitoring, key performance indicator monitoring and alarming, maintenance scheduling and so on.

In one embodiment the MES 110 is connected with one or more MES data stores 130. The MES data stores 130 may be databases, file systems, or other arrangements of data on nonvolatile memory (e.g., hard disk drives, tape drives, optical drives, etc.), volatile memory (e.g., random access memory (RAM)), or combination thereof. Each MES data store 130 may store, for example, historical process information of manufacturing recipes (e.g., temperatures, pressures, chemicals used, process times, etc.), equipment maintenance histories, inventories, etc.

An EI provides an interface between the MES 110 and a manufacturing tool. An EI may be implemented in hardware, software or a combination of both, depending on the implementation. An EI can be used with any of the manufacturing tools 105-107, without requiring any programming of manufacturing tools 105-107. EI provides a configuration user interface 117 that allows a user to configure the EI for a specific tool. In particular, during a configuration or set up phase, data streams to be published by manufacturing tool 105 are determined using a configuration user interface 117. The configuration user interface 117 is a graphical user interface (GUI) standardized across the plurality of manufacturing tools to simplify the configuration. Hence, configuration user interface 117 provides a single point of entry to configure EI 114 or EI 115, etc to integrate manufacturing tool 105 or 106, respectively, with MES 110. In response to receiving user input of configuration settings, EI 114 is configured for manufacturing tool 105.

At processing time, MES 110 sends EI 114 a request for data to be collected upon processing of workpiece 101. EI 114 may then collect the requested data as published by manufacturing tool and return the collected data to MES 110. Because each EI 114-116 has been configured to interface in one to one correspondence with a manufacturing tool, 105-107 respectively, manufacturing data streams which are not standardized across the manufacturing tools may nonetheless be integrated into the MES 110.

Figure 2:
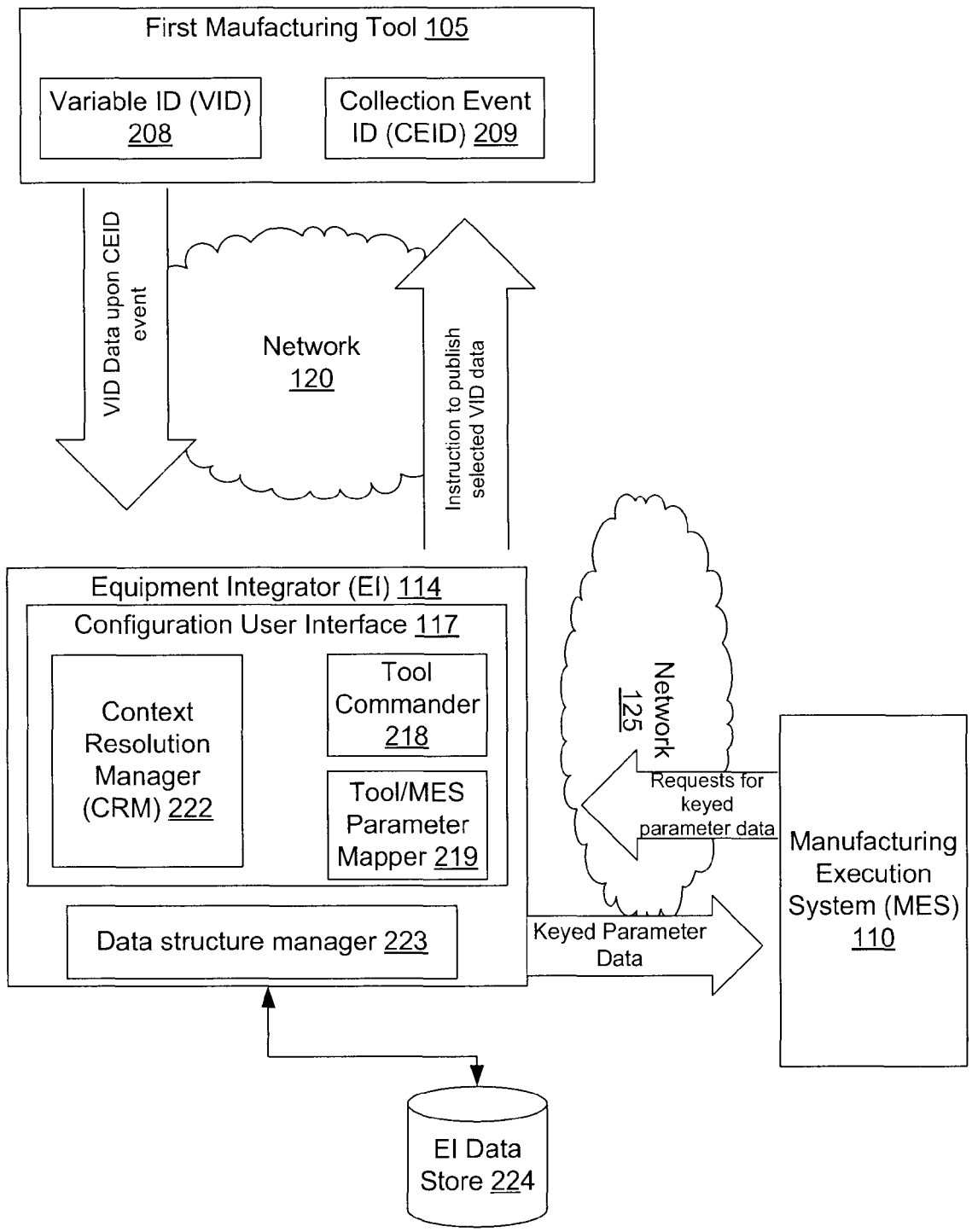
FIG. 2 illustrates an entity relationship diagram of an equipment integrator, a manufacturing tool and a MES, in accordance with an embodiment.

FIG. 2 illustrates an entity relationship diagram of EI 114, manufacturing tool 105 and a MES 110, in accordance with an embodiment. With the three component architecture 200, the EI 114 may integrate the MES 110 with manufacturing tool 105 to support automated data collection without substantially modifying the functionality and structure of the MES 110. As shown, manufacturing tool 105 is associated with a particular set of tool-specific variable identifiers (VID)

208. As depicted, manufacturing tool 105 may be further associated with a particular set of tool-specific collection event identifiers (CEID) 209. These sets include all data and event identifiers supported by the manufacturing tool 105 as defined by the tool vendor. A VID is generally a unique identifier type associated with a particular data source of the manufacturing tool 105. The data stream of a particular VID in the VID set 208 may include process parameter sensor data as well as identifying data, such as slot number or workpiece ID. The VID or CEID data sources may be output from the manufacturing tool 105 using a self-describing metadata standard. The data of a VID or CEID source may be multiplexed into a serial data. In one specific embodiment, the data source from the manufacturing tool 105 complies with SEMI E5-1130 SEMI Equipment Communications Standard 2 Message Content (SECS-II).

A CEID of the CEID set 209 is similarly a unique identifier type associated with events occurring in manufacturing tool 105 as determined and posted by an event handler. A CEID data source may, for example, include a "process begun" or "process complete" event. CEID and VID are not necessarily standardized to particular data such that CEID 1000 may correspond to the "process begun" event stream in manufacturing tool 105 while CEID 1000 may correspond to the "process complete" event in another tool, such as manufacturing tool 106 of FIG. 1.

As further shown in FIG. 2, EI 114 may send instructions to manufacturing tool 105 specifying which one(s) of the plurality of VID and CEID available are to be published during processing of a workpiece (i.e. runtime). Because there may be many hundreds of CEID and VID depending on type of sensors available on manufacturing tool 105, it is advantageous to configure a subset of CEID and VID sources. In one embodiment, such a configuration may be performed by the configuration user interface 117, as discussed further elsewhere herein. EI 114 further includes a tool commander 218 to instruct the manufacturing tool 105 to output specific VID data sources upon the occurrence of specific events. Such an instruction may provided in the form of a set up instruction sent from EI 114 to manufacturing tool 105 or on a more real-time basis in response to the EI 114 receiving a request for data from MES 110.

EI 114, as illustrated, includes tool/MES parameter mapper 219 to map a specific data parameter requested by MES 110 to a corresponding first VID specific to manufacturing tool 105. EI 114 also includes context resolution manager (CRM) 222 to map a specific database key identified by MES 110 to a corresponding second VID specific to manufacturing tool 105. The CRM 222 may thereby filter all VID data received from manufacturing tool 105 based on a criteria corresponding to the database key upon a selected CEID event. As discussed further elsewhere herein, configuration user interface 117 may be employed by a user to configure the tool/MES parameter mapper 219 or CRM 222 during system configuration. EI 114 further includes data structure manager 223 and may also include EI data store 224. Data structure manager 223 generates a data structure to hold VID data and loads the VID data identified based on the tool/MES parameter mapper 219. EI data store 224 may be any of the systems previously described for MES data store 130 to cache VID and/or CEID data sent by manufacturing tool 105.

Figure 3:
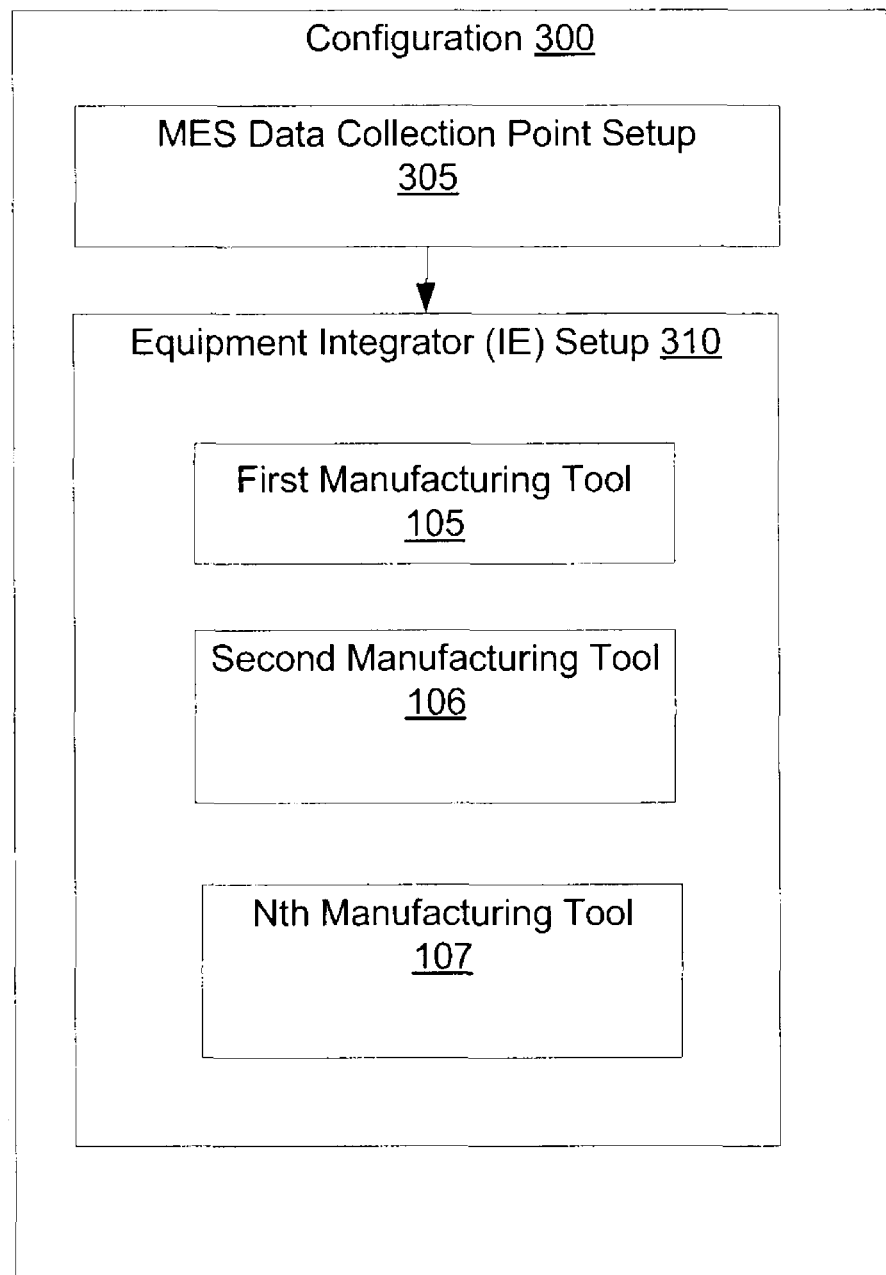
FIG. 3 illustrates a flow diagram illustrating a process of configuring data collection in a MES and an equipment integrator, according to an embodiment.

FIG. 3 illustrates a flow diagram illustrating a process of configuring data collection in a MES and an equipment integrator, such as that depicted in FIG. 3, according to one embodiment. The exemplary configuration method 300 includes both a MES data collection point setup step 305 and an EI setup 310. a MES data collection point corresponds to a manufacturing operation where data is to be collected. The MES data collection point setup 305 is performed in a manner independent of the specific manufacturing tool which may be used to provide data to a MES, such as MES 110. For example, a factory may have different plasma etch systems, but similar data will be desired for a particular manufacturing process, regardless of the specific etch system employed to perform that process.

The EI setup 310, however, is to be performed for each specific manufacturing tool performing a given process. For example, EI setup 310 may include a setup of first manufacturing tool 105, second manufacturing tool 106 up to the nth manufacturing tool 107. This individualized setup accounts for differences in the data output capabilities and configurations across various manufacturing equipment types, generations and vendors. Each EI setup 310 may have only a few dissimilarities across the various manufacturing tools and so much of the configuration of one apparatus may be rapidly replicated across a plurality.

Figure 4:
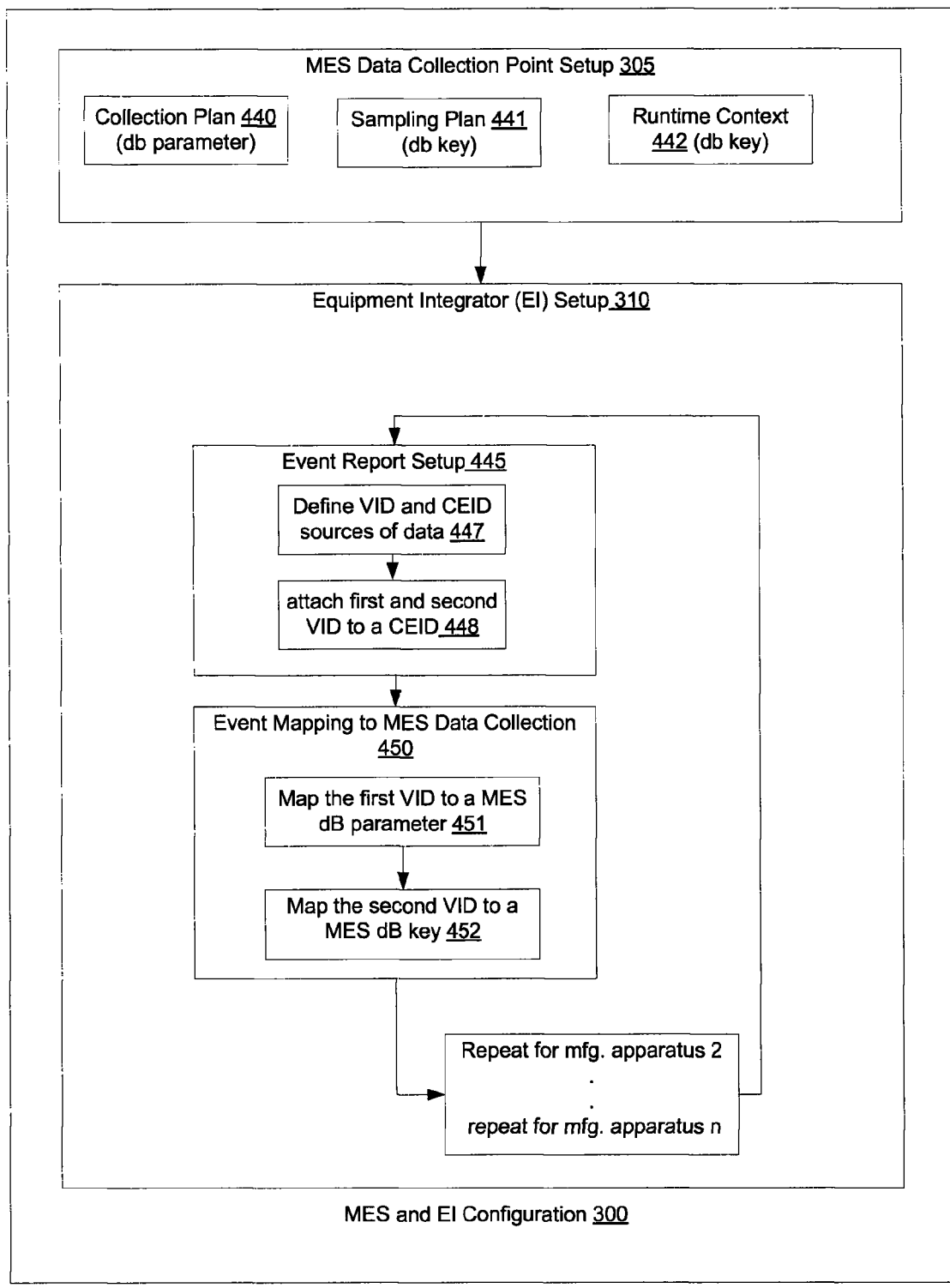
FIG. 4 illustrates a flow diagram illustrating a further process of configuring a database parameter and a database key in the MES and the equipment integrator, according to an embodiment.

FIG. 4 illustrates a flow diagram further illustrating method 300 of configuring a database parameter and a database key in the MES and the EI, according to an embodiment. As further shown, MES data collection point setup step 305 is defined on the basis of a collection plan 440, sampling plan 441 and runtime context 442.

During MES data collection point setup, at step 305, specification of the collection plan 440 defines a database parameter in the MES to be populated. Thus, the collection plan 440 is a set of data collection parameters specifying "what" is to be collected. For example, one collection plan at a plasma etch operation may specify collection of endpoint time(s). As another example, one collection plan at a thickness measurement operation may specify collection of thin film thickness measurement value(s).

During MES data collection point setup, at step 305, specification of the sampling plan 441 and runtime context 442 define a database key in the MES to which the database parameter is keyed. A sampling plan specifies how many readings are required at a particular collection point. It should be appreciated that the sampling plan 441 enables data to be selected for a subset of the workpieces processed (i.e. a "sample"). Indeed, multiple samples can be defined, with different database parameters to be collected for different samples. For the thickness measurement operation, five thickness values may be specified for slot 1 of a workpiece carrier while single site data may be collected for slots 5 and 7. Finally, particular implementations of the MES data collection point setup step 305 may include runtime context 442 which allows for data collection context to be specified at runtime during Data Collection. For example, where a wafer slot is to be selected at random at a thickness measurement operation, the identity of the slot number selected may be determined at runtime to complete keying of the database parameter.

As depicted in EI setup 310, event report setup 445 and event mapping 450 are performed for each specific manufacturing tool handling a workpiece at the operation corresponding to the MES data collection point.

Event report setup 445 includes a definition at step 447 and an attachment at step 448. At step 447, the VIDs are defined (e.g., by the tool commander 218 depicted in FIG. 2). Here, the data collection events to be collected from a particular manufacturing tool are defined in an EI, such as EI 114 of FIG. 3. Selection of a CEID defines the manufacturing tool events the VID data source(s) will be associated with when the apparatus processes a workpiece. In one embodiment, the set up step 447 defines the universe of data that is to be made available by the manufacturing tool for any possible transfer to a MES.

Figure 5A:
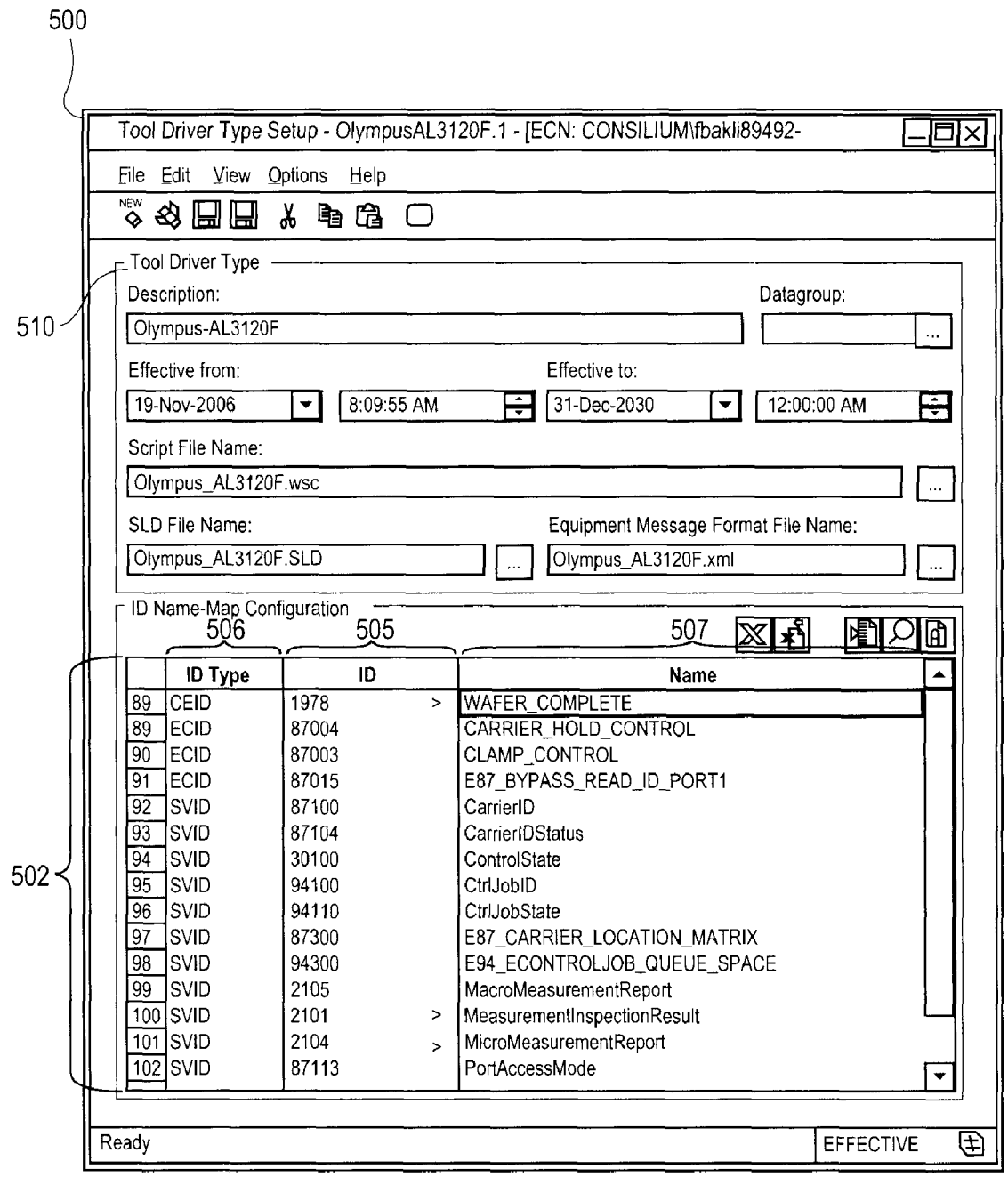
FIG. 5A illustrates a graphical user interface (GUI) for defining a data element identifier to be published by a manufacturing tool, according to an embodiment.

FIG. 5A illustrates an exemplary GUI 500 for receiving user input to define a data element identifier (e.g. VID or CEID) that will be published by a manufacturing tool, according to an embodiment. FIG. 5A may, for example, depict the event report setup step 447 for manufacturing tool 105 of FIG. 4. As shown in FIG. 5A, the GUI 500 includes a table view 502 including a VID/CEID 505 (e.g. 1978), the associated "ID Type" 506 (e.g. CEID) and the associated "Name" 507 of the data element identifier (e.g. "WAFER_COMPLETE"). As depicted various ones from the data element identifier table view of GUI 500 may be selected by a user during setup step 447 to define the source(s) of data and collection events to be published by a particular manufacturing tool defined in the description as "Olympus-AL3120F" under the Tool Driver Type 510.

Figure 5B:
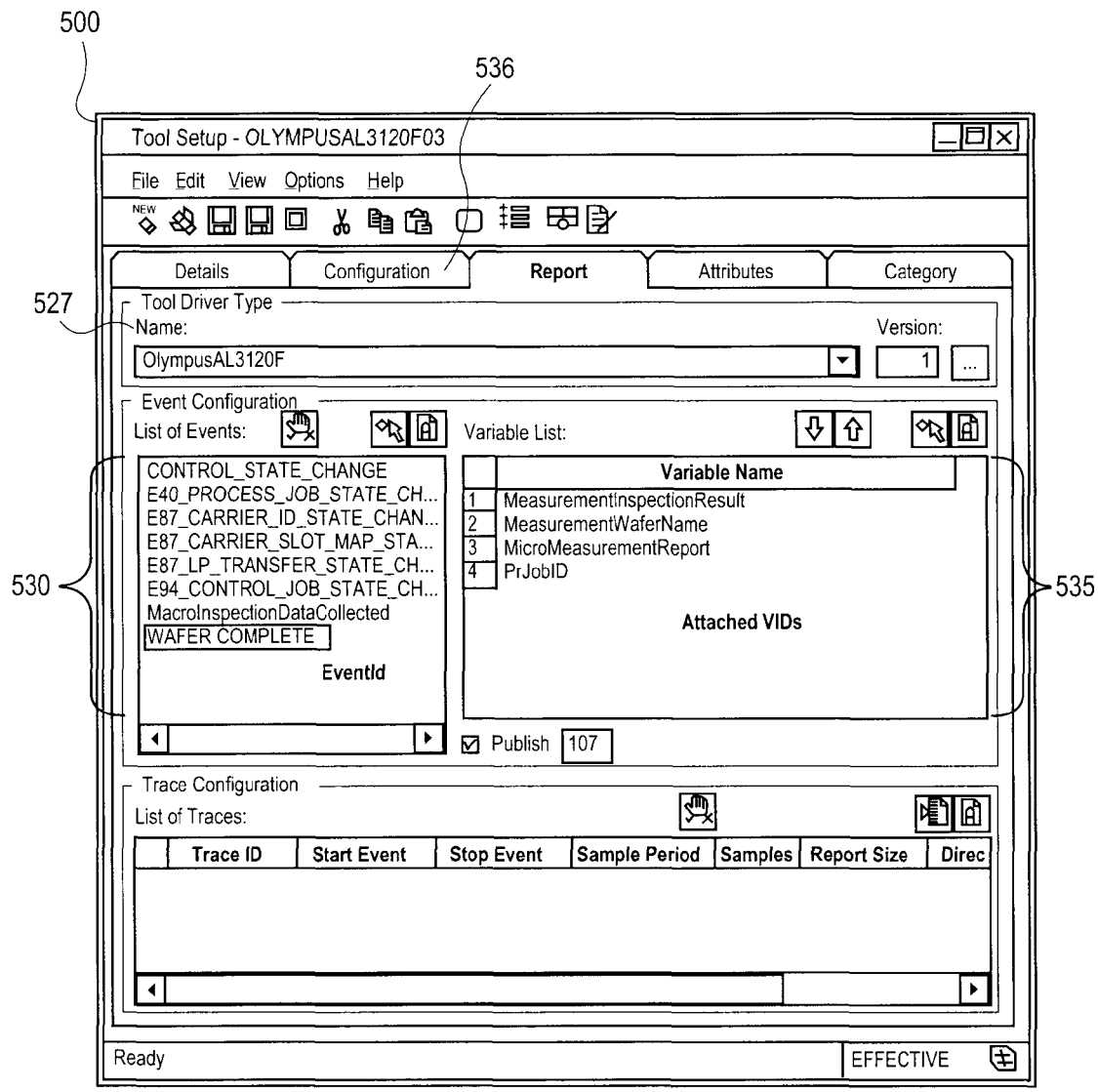
FIG. 5B illustrates a graphical user interface (GUI) for mapping a defined data element identifier to a process event of the manufacturing tool, according to an embodiment.

Next, returning to FIG. 4, a VID defined in step 447 is then attached to a specific tool collection event at step 448. Here, the VID may be attached based on user input. A user may thereby configure an instruction to be sent from the EI (e.g., via the tool commander 218 depicted in FIG. 2) to the manufacturing tool to publish certain of the selected VID upon the occurrence of certain events identified by a CEID. In a particular depicted embodiment, a first and second VID is attached to one common CEID at step 448. For example, FIG. 5B illustrates an exemplary GUI 525 for mapping a data element identifier to a process event of the manufacturing tool, according to one embodiment. As shown, for the particular manufacturing tool identified as "OlympusAL3120F" in the name field 527, a choice list 530 displays to a user the Name 507 entry representing CEIDs defined in step 447. In response to a selection of a CEID name from choice list 530, choice list 535 displays to a user the Name 507 of VIDs attached to the selected CEID name. Hence, each time "OlympusAL3120F" is to publish that a "WAFER COMPLETE" event has occurred, the four VID data streams "MeasurementInspectionResult," "MeasurementWaferName," "MicroMeasurementReport" and "PrJobID" are also to be published. The GUI 525 may further employ the choice list 530 to select a VID to be added or removed by the system from the list of attached VIDs, (e.g., by selection of the "Configuration" tab 536).

Returning to FIG. 4, upon the completion of step 448 an instruction to publish a VID based on CEID may be sent to the manufacturing tool anytime to complete the Event Report Setup 445. For example, the instruction may be sent from the EI when a manufacturing tool first comes on line and establishes communication with the EI. With the event report setup 445 complete, at event mapping 450, the data publication events from setup 445 may be mapped to the MES data collection point setup from step 305 based on user input. A first mapping is performed at step 451, with, for example, the tool/MES parameter mapper 219 depicted in FIG. 2 as configured by user input received through the configuration user interface 117. Here, a first VID from those attached at step 448 is mapped to a MES database parameter defined in collection plan 440. It should be appreciated however, that in an alternate embodiment, a CEID may be similarly mapped to the MES data collection point setup from step 305 based on user input, depending on the data desired.

Figure 5C:
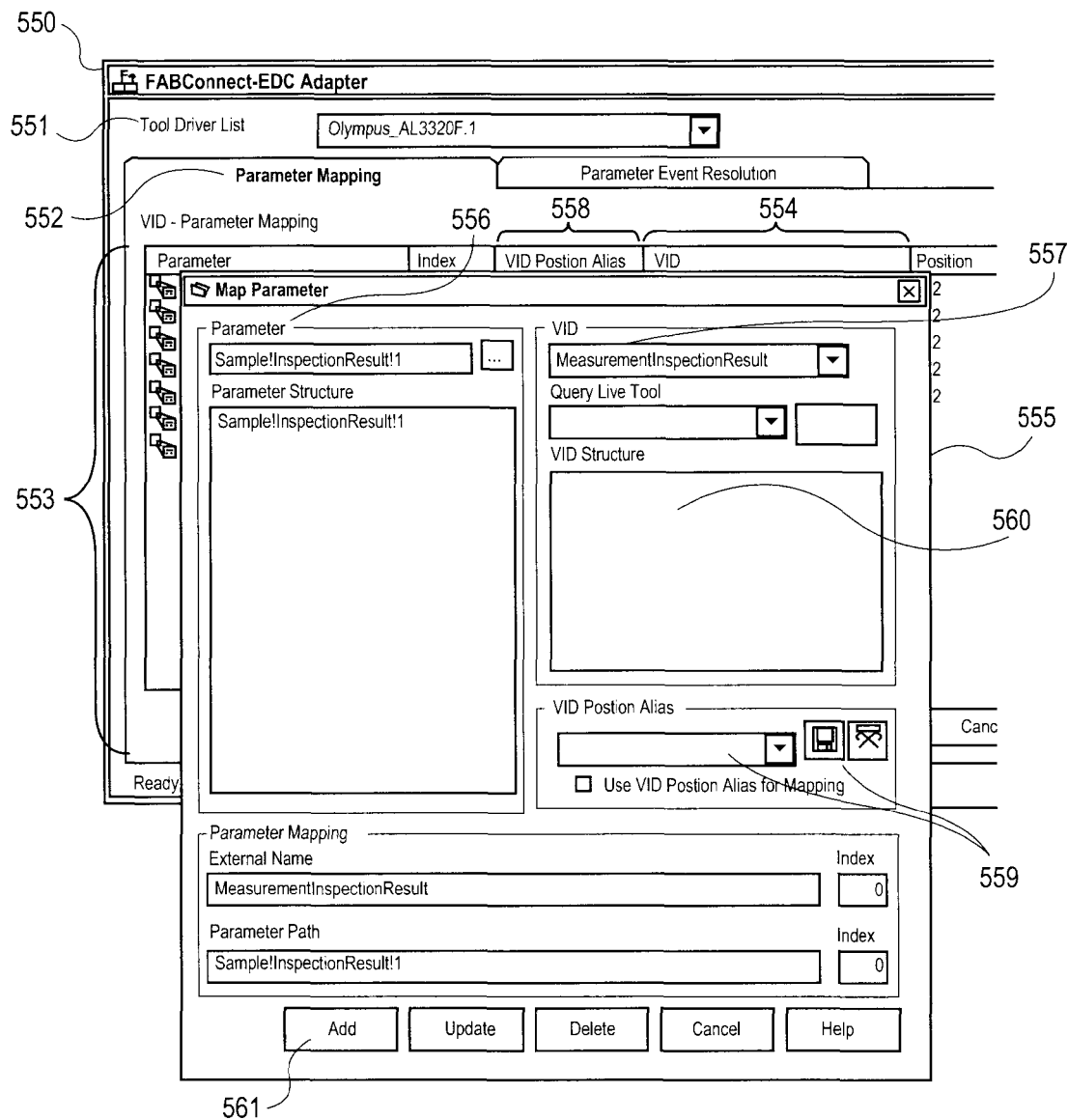
FIG. 5C illustrates a graphical user interface (GUI) for mapping a first data element identifier to a MES database parameter, according to an embodiment.

FIG. 5C illustrates an exemplary GUI 550 for mapping a first VID to a MES database parameter, according to an embodiment. As shown, for a particular manufacturing tool identified by the Tool Driver List 551 as "Olympus_AL3320F.1" a "Parameter Mapping" tab 552 includes a "Parameter" indicating a MES database parameter in choice list 553. Upon a user's selection of a parameter listed in choice list 553, a VID mapped to the selected parameter is displayed in the choice list 554. In response to a user action, for example double clicking on a parameter listed in choice list 553, dialog box 555 is displayed to the user. Dialog box 555 allows the user to pair the MES database parameter "Sample!InspectionResult!1" shown as the selected parameter 556 with an entry representing the VID name "MeasurementInspectionReport" from the choice list 557.

As further depicted in FIG. 5C, in addition to mapping the manufacturing tool VID name to the MES database parameter, the location of a specific data element in the data structure returned for the mapped VID may also be configured in response to receiving a user's input. Such mapping within a VID is necessary where a manufacturing tool returns a data structure consisting of a plurality of data fields for a particular VID and only a subset of those fields are to be returned to the MES. In the exemplary user interface shown, "VID Position Alias" field 558 corresponding to a MES database parameter displayed in choice list 553 is configured in response to a user selecting a "VID Position Alias" from the import controls 559 for the selected parameter 556. The "VID Position Alias" value specifies where in a data structure specific data is located. In certain embodiments, the system receives a user's identification of a file describing the data structure of the VID selected from choice list 557. The file may then be imported by the system from the manufacturing apparatus and displayed in the "VID Structure" dialog box 560. From dialog box 560, the system then receives a user's selection of a VID position and/or array index within the data structure to be extracted from the data published for that VID.

With a manufacturing tool VID identified (e.g. in choice list 557) and, if necessary, the location of the data in the mapped VID identified (e.g. "VID Position Alias" field 558), the user may then click on the "add" button 561 and the system maps the first VID to a MES database parameter. Because the choice list 557 may be imported from the VID/CEID definition of step 447 of FIG. 4, a user may rapidly identify a desired VID name. The parameters listed in choice list 553 may also be similarly imported by the EI from the MES.

A second VID may then be mapped to a MES database key at step 452 of FIG. 4. Configuration of an event map in step 452 is advantageous because even though a manufacturing tool publishes the data associated with each VID upon every occurrence of an event configured in step 448 of FIG. 4, the MES sampling plan 441 may define that only a subset of the published event data is to be stored by in the MES database. This subset may be identified by examining the second VID mapped to the MES database key at step 452 and determining if the data value corresponding to the second VID satisfies a criteria defined in the MES database key. Because the first and second VIDs are attached to the same event, filtering of the data of first VID may be done on the basis of the second VID.

For example, where the MES sampling plan 441 indicates a wafer ID is to be a database key, the value of a second VID corresponding to the wafer ID may then be compared to a value of the wafer ID key defined by the MES. When the two values are equal then the subset of data of another VID, such as the first VID mapped to a MES database parameter at step 451 may be stored as filtered data. Thus, the mapping defined in table CRM TABLE 575 links the manufacturing tool data value that supplies the slot number in a manufacturing tool data event 579 (e.g. "WAFER_COMPLETE" event name) to the corresponding MES name for the data so the data from the manufacturing tool for slot 20 can be matched to sample 3 for slot 20 in the MES sampling plan.

The mapping of the second VID may be performed by CRM 222 through the configuration user interface 117 of FIG. 2. FIG. 5D illustrates a user configurable CRM table 575 which may be displayed in as an editable GUI by the configuration user interface 117, in accordance with one embodiment. As depicted, a VID name filter 577 and a VID value filter 578 may be provided by a user and associated with a particular CEID name defined in the Data event 579. A value in CRM table 575 can be either constant (e.g. "PROCESSING") or filled from the value of a variable reference (e.g. @WaferId) which is a runtime value that may provided in a workflow context. Thus, in the example of FIG. 5D, the VID value filter 578 is configured to have the runtime value "WaferID," determined from the MES database parameter defined to be the "WaferId" parameter. Only when this value is equal to the data of VID Name "WAFER_ID" published by a particular manufacturing tool, is the published data of the event 579 "WAFER_COMPLETE" to be stored by the EI.

Returning to FIG. 4, upon set up of event filtering based on the second VID at step 452, the MES and EI setup 310 is substantially complete for one manufacturing tool and then may be repeated for another tool, such as manufacturing tool 2 of FIG. 3. When the EI has been configured for all manufacturing tools, MES and EI configuration method 300 is substantially complete.

With the configuration of the MES, EI and manufacturing tool (by way of the EI instructions) complete, the three component architecture is ready for runtime. At runtime, the MES may dispatch a workpiece to a manufacturing operation for which a data collection point has been configured. The MES may then start a data collection instance and send an instruction to initiate processing of the workpiece by the manufacturing tool.

Figure 6:
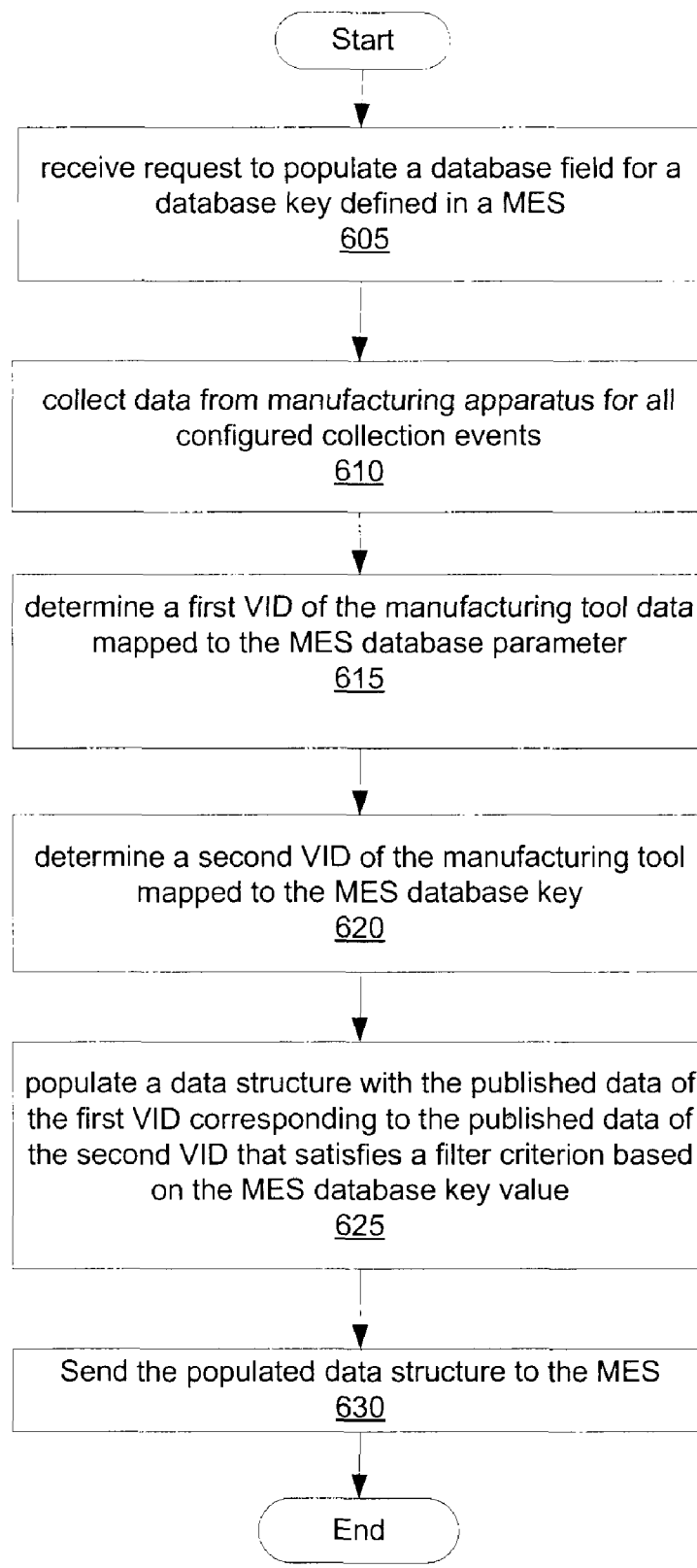
FIG. 6 illustrates a flow diagram illustrating a method of populating a MES database parameter with a data element from a manufacturing tool, according to an embodiment.

FIG. 6 illustrates a flow diagram illustrating a method 600 of sending data from a manufacturing tool to a MES, according to one embodiment. The method may be performed by processing logic that may comprise hardware (e.g., circuitry, dedicated logic, programmable logic, microcode, etc.), software (such as instructions run on a processing device), or a combination thereof. In one embodiment, method 600 is performed by EI 114 of FIG. 2.

At step 605, an EI receives a request from the MES to populate a database parameter, such as the database parameter defined by collection plan 440 in FIG. 4. The request may further include a database key, such as the database key defined by the sampling plan 441.

In response to the MES request, the EI creates a data structure to hold data from the manufacturing tool based on the information provided in the MES request. For example, the EI may create a data structure configured to hold an array of data values, wherein each element of the array is for a particular workpiece to be processed. The EI may then send processing instructions to the manufacturing tool to initiate processing of the workpiece. For example, the processing instructions sent by the EI may include the process job data defined in the SEMI E40 standard for Processing Management (E40 SECS) or control job data defined in the SEMI E94 Control Job Management (E94 SECS) standard.

With processing of the workpiece underway, the manufacturing tool will begin publishing data upon the occurrence of events per the instruction sent based on the configuration information defined during event report setup 445 of FIG. 4. Depending on the embodiment, such instructions may have been sent by the EI before or after the EI received the request for data from the MES. In FIG. 6, step 610, the EI collects the data sent by the manufacturing tool. In one embodiment, for example the EI caches the data received during processing of the workpiece in the EI data store 224 of FIG. 2. The data sent by the manufacturing tool may be of any number of VIDs as configured, certain ones of which may not be needed for the particular data collection request sent by the MES. Such a situation may occur, for example, when a manufacturing tool is configured to publish a first set of VIDs for a first data collection point and a second set of VIDs for a second data collection point. At each individual data collection point therefore, one of the sets of VID data will not correspond to the data requested by the MES and therefore may be cached by the EI but not ultimately returned to the MES.

In an alternate embodiment, the EI may, upon receipt of a data request from the MES, cause the manufacturing tool to only publish the VID data corresponding to that MES data request. In one such embodiment, the EI causes the manufacturing tool to publish the VID data based on the processing instructions. The VID data to be published by the tool will then be specific for only the workpiece(s) identified by the MES processing instruction. For example, the EI sends an instruction to the manufacturing tool to process only a subset of the workpieces (e.g. metrology tool to measure slots 1, 3 and 5) and to publish either the first or second set of VID data depending on the process job for those slots. Therefore, the event report setup 445 is essentially automatically reconfigured by the EI at runtime such that the data source for each manufacturing operation would become a subset of the universe of VID data sources initially defined by a user at setup 445. The VID data published is further reduced to be only that data associated with the subset of workpieces processed by the manufacturing tool. Such embodiments advantageously streamline the data publication reducing process threads in the manufacturing tool and are possible where the manufacturing tool is capable of accepting data publication instructions at runtime.

Returning to method 600 in FIG. 6, at step 615 the EI accesses a first configuration setting to determine a first VID of the manufacturing tool data corresponding to the requested MES database parameter. In one embodiment, the first VID is the first VID mapped at step 451 of the EI configuration setup 310 in FIG. 4. Next, at step 620 the EI accesses a second configuration setting to determine a second VID of the manufacturing tool data corresponding to the MES database key. In one embodiment, the second VID is the second VID mapped at step 452.

Based on the first and second configuration setting, the EI loads the data collected from the manufacturing tool into the data structure at step 625. For unfiltered data (e.g. where CRM 222 of FIG. 2 is not configured with filter entries 577 and 578 in FIG. 5d), all data of the first data element identifier (e.g. first VID) mapped to the MES database parameter requested is loaded into the data structure created by the EI. For embodiments where the data is filtered against a MES database key, the published data of the second data element identifier (e.g. second VID) is compared to the MES database key value of the data collect request sent by the MES. In one embodiment the filter criterion is met if the published data of the second VID equals the MES database key value. The data structure is the loaded with the published data of the first VID corresponding to the published data of the second VID meeting the filter criteria. Thus, the first configuration setting may provide the information to map specific data inside a collection event from the manufacturing tool to parameters of the MES collection point and the second configuration setting may provide the information to map specific data to different events (e.g. "WAFER_COMPLETE" event for wafer 1 vs.

"WAFER_COMPLETE" event for wafer 2) to the correct sample of the MES collection point.

The populated data structure is then sent by the EI to the MES at step 630. The MES then stores the data in for example, the data store 130 of FIG. 1. The method 600 for populating a MES database parameter is then substantially complete.

Figure 7:
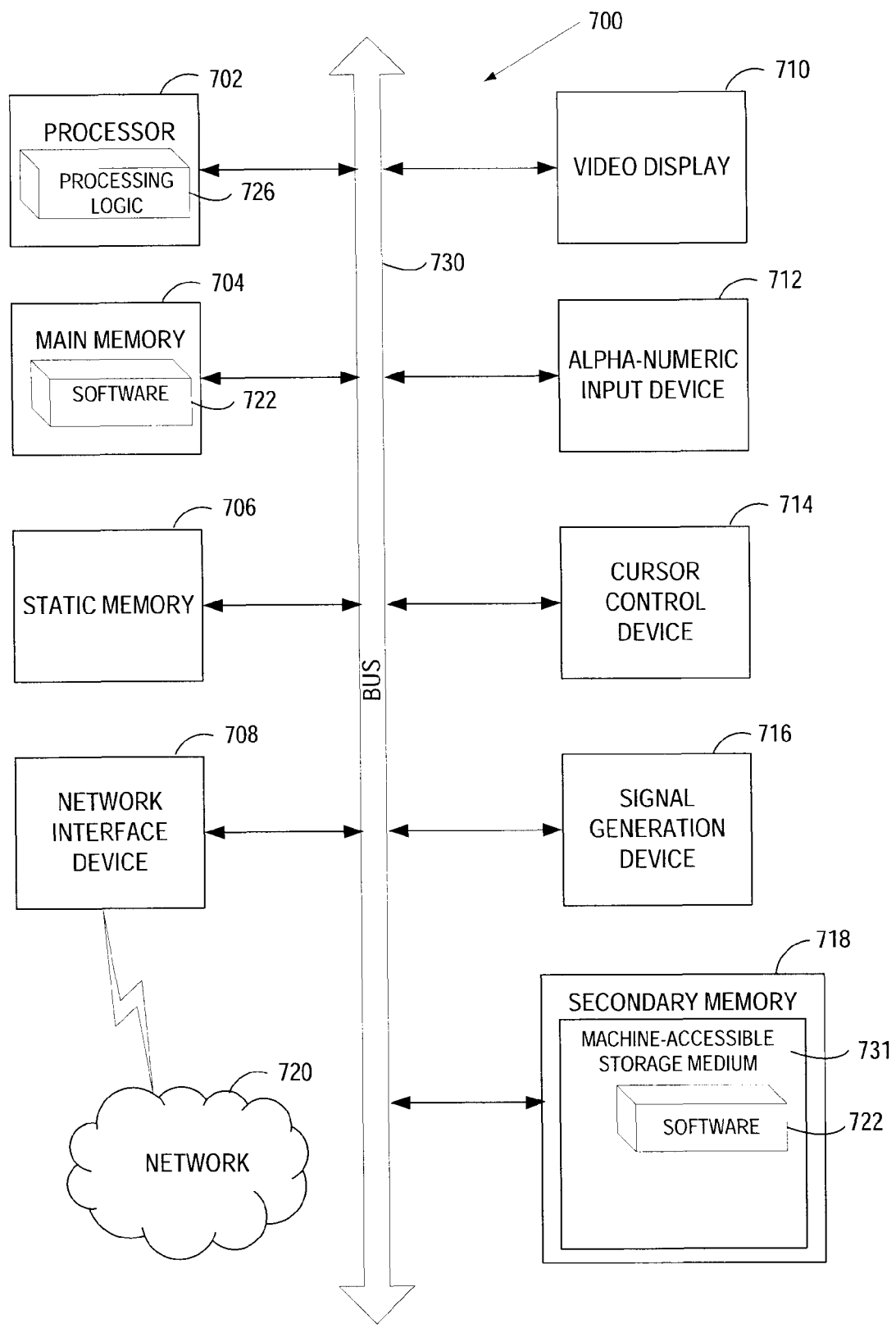
FIG. 7 illustrates a block diagram of an exemplary computer system, in accordance with one embodiment of the present invention

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 718 (e.g., a data storage device), which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The secondary memory 718 may include a machine-accessible storage medium (or more specifically a computer-readable storage medium) 731 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface device 708.

The machine-accessible storage medium 731 may also be used to store an equipment integrator and/or user interface (e.g., the EI 114 and configuration user interface 117 of FIG. 1), and/or a software library containing methods that call an EI and/or a user interface of the EI. The machine-accessible storage medium 731 may further be used to store one or more additional components and EI, such as a CRM 222, and tool/MES parameter mapper 219. While the machine-accessible storage medium 731 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A non-transitory computer readable storage medium having instructions stored thereon which cause a data processing system to perform a method for an equipment integrator comprising:

providing a graphical user interface to receive user input of configuration information for the equipment integrator operable with a plurality of manufacturing tools, the configuration information to adapt the equipment integrator to a unique tool-specific data stream publishable by each manufacturing tool of the plurality;

attaching a first variable identifier to a collection event identifier of the manufacturing tool in response to receiving a user input identifying both the first variable identifier and the collection event identifier;

attaching a second variable identifier to the collection event identifier in response to receiving a user input identifying both the second variable identifier and the collection event identifier;

receiving a request from a manufacturing execution system for data from a manufacturing tool of the plurality;

sending an instruction to the manufacturing tool to publish data of the first and second variable identifier upon occurrence of the event identified by the collection event identifier;

mapping the data collected for a-the first variable identifier to a tool-independent manufacturing execution system database parameter, the mapping based on the equipment integrator configuration information; and populating a data structure with the mapped data to be returned to the manufacturing execution system.

2. The non-transitory computer readable storage medium as in claim 1, wherein sending the instruction to the manufacturing tool to publish the tool-specific data stream is performed prior to receiving the request for the data from the manufacturing execution system.

3. The non-transitory storage medium as in claim 1, wherein attaching the
first variable identifier to the collection event identifier further comprises:
displaying to a user a choice list comprising at least an entry representing the collection event identifier;
displaying to a user a choice list comprising at least an entry representing the first variable identifier; and
mapping the first variable identifier to the collection event identifier in response to receiving a user selection of the entry representing the collection event identifier and a user selection of the entry representing the first variable identifier.

4. The non-transitory storage medium as in claim 1, wherein mapping the first
variable identifier to the manufacturing execution system database parameter further comprises:
displaying to the user a choice list comprising at least an entry representing the manufacturing execution system database parameter;
displaying to the user a choice list comprising at least an entry representing the first variable identifier of the and
mapping the first variable identifier with the manufacturing execution system database parameter in response to receiving a user selection of the entry representing first variable identifier and a user selection of the entry representing the manufacturing execution system database parameter.

5. The non-transitory storage medium as in claim 1, further comprising:
mapping a-the second variable identifier to a manufacturing execution system database key in response to receiving a user input identifying both the second variable identifier and the manufacturing execution system database key.

6. The non-transitory storage medium as in claim 5, wherein populating the data structure further comprises:
loading, into the data structure, data of the first variable identifier corresponding to data of the second variable identifier that is equal to that of a manufacturing execution system database key.

7. The non-transitory storage medium as in claim 6, wherein the first variable identifier identifies a variable describing a processing condition of the manufacturing tool and wherein the second variable identifier identifies a variable describing an identification of a workpiece exposed to the processing condition.

8. An equipment integrator to provide an interface between a plurality of manufacturing tools and a manufacturing execution system, the equipment integrator further comprising:
a computer platform including a microprocessor and a memory, the computer platform networked to a manufacturing tool and the manufacturing execution system, the computer platform to:
provide a graphical user interface to receive user input of configuration information for the equipment integrator operable with a plurality of manufacturing tools, the configuration information to adapt the equipment integrator to a unique tool-specific data stream publishable by each manufacturing tool of the plurality;
attach a first variable identifier to a collection event identifier of the manufacturing tool in response to receiving a user input identifying both the first variable identifier and the collection event identifier;
attach a second variable identifier to the collection event identifier in response to receiving a user input identifying both the second variable identifier and the collection event identifier;
receive a request from a manufacturing execution system for data from a manufacturing tool of the plurality;
send an instruction to the manufacturing tool to publish data of the first and second variable identifier upon occurrence of the event identified by the collection event identifier
collect data from the tool-specific data stream;
map the data collected for the first variable identifier-to a tool-independent manufacturing execution system database parameter, the mapping based on the equipment integrator configuration information; and
populate a data structure with the mapped data to be returned to the manufacturing execution system.

9. The equipment integrator as in claim 8, the graphical user interface to display to a user a choice list comprising at least an entry representing the collection event identifier and to display to a user a choice list comprising an entry representing the first variable identifier; and the computer platform to map the first variable identifier to the collection event identifier in response to the graphical user interface receiving a user selection of the entry representing the collection event identifier and a user selection of the entry representing the first variable identifier.

10. The equipment integrator as in claim 8, the computer platform to map the first variable identifier to the manufacturing execution system database parameter in response to receiving a user input the through the graphical user interface identifying the first variable identifier and the manufacturing execution system database parameter.

11. The equipment integrator as in claim 8, the computer platform further to map a second variable identifier to the manufacturing execution system database key in response to the graphical user interface receiving a user input identifying both the second variable identifier and the manufacturing execution system database key.

12. The equipment integrator as in claim 8, the computer platform to load into the data structure data of the first variable identifier corresponding to data of the second variable identifier that is equal to that of a manufacturing execution system database key identifying a workpiece exposed to processing by the manufacturing tool characterized by data of the first variable identifier.

13. A computer implemented method for an equipment integrator, comprising:
providing a user interface to receive user input of configuration information for an equipment integrator operable with a plurality of manufacturing tools, the configuration information to adapt the equipment integrator configuration to a unique tool-specific data stream publishable by each manufacturing tool of the plurality;
attaching the first variable identifier to a collection event identifier of the manufacturing tool in response to receiving a user input identifying both the first variable identifier and the collection event identifier;
attaching the second variable identifier to the collection event identifier of the manufacturing tool in response to receiving a user input identifying both the second variable identifier and the collection event identifier;

receiving a request from a manufacturing execution system for data from a manufacturing tool of the plurality;

sending an instruction to the manufacturing tool to publish data of the first and second variable identifier upon occurrence of the event identified by the collection event identifier;

collecting data from the tool-specific data stream;

mapping the data collected for a first variable identifier of the manufacturing tool to a tool-independent manufacturing execution system database parameter, the mapping based on the equipment integrator configuration information; and populating a data structure with the received data to be returned to the manufacturing execution system.

14. The method as in claim 13, wherein attaching the first variable identifier to the first collection event identifier further comprises:

displaying to a user a choice list comprising at least an entry representing the collection event identifier;

displaying to a user a choice list comprising at least an entry representing the first variable identifier; and mapping the first variable identifier to the collection event identifier in response to receiving a user selection of the entry representing the collection event identifier and a user selection of the entry representing the first variable identifier.

15. The method as in claim 13, further comprising:

mapping the second variable identifier to a manufacturing execution system database key in response to receiving a second user input identifying both the second variable identifier and the manufacturing execution system database key.

16. The method as in claim 15, wherein mapping the second variable identifier to the manufacturing execution system database key further comprises:

displaying to the user a choice list comprising at least an entry representing the manufacturing execution system database key;

displaying to the user a choice list comprising at least an entry representing the second variable identifier of the manufacturing tool data; and mapping the second variable identifier with the manufacturing execution system database key in response to receiving a user selection of the entry representing second variable identifier and a user selection of the entry representing the manufacturing execution system database key.

17. The method as in claim 15, wherein populating the data structure further comprises loading into the data structure data of the first variable identifier corresponding to data of the second variable identifier that is equal to that of a manufacturing execution system database key.

18. The method as in claim 13, wherein mapping the first variable identifier to the manufacturing execution system database parameter further comprises:

displaying to the user a choice list comprising at least an entry representing the manufacturing execution system database parameter;

displaying to the user a choice list comprising at least an entry representing the first variable identifier of the manufacturing tool data; and wherein mapping the first variable identifier with the manufacturing execution system database parameter is in response to receiving a user selection of the entry representing first variable identifier and a user selection of the entry representing the manufacturing execution system database parameter.

19. A non-transitory computer readable storage medium having instructions stored thereon which cause a data processing system to perform a method for an equipment integrator comprising:

providing a user interface to facilitate user input of configuration information for the equipment integrator operable with a plurality of manufacturing tools, the equipment integrator configuration information adaptable to each manufacturing tool of the plurality;

receiving a request from a manufacturing execution system for data from a manufacturing tool of the plurality;

sending an instruction to the manufacturing tool to publish the data, the instruction based on the equipment integrator configuration information;

mapping the data received from the manufacturing tool needed to satisfy the request based on the equipment integrator configuration information, wherein mapping the data received from the manufacturing tool further comprises mapping a first variable identifier to a manufacturing execution system database parameter in response to receiving a user input identifying the first variable identifier and the manufacturing execution system database parameter, wherein mapping the first variable identifier to the manufacturing execution system database parameter further comprises:

displaying to the user a choice list comprising at least an entry representing the manufacturing execution system database parameter;

displaying to the user a choice list comprising at least an entry representing the first variable identifier of the manufacturing tool data; and mapping the first variable identifier with the manufacturing execution system database parameter in response to receiving a user selection of the entry representing first variable identifier and a user selection of the entry representing the manufacturing execution system database parameter; and populating a data structure to be returned to the manufacturing execution system based on the data mapping.

* * * * *